(12) United States Patent
Asano et al.

(10) Patent No.: US 12,286,125 B2
(45) Date of Patent: Apr. 29, 2025

(54) VEHICLE MOTION CONTROLLER

(71) Applicants: ADVICS CO., LTD., Kariya (JP); TOYOTA JIDOSHA KABUSHIKI KAISHA, Toyota-shi (JP)

(72) Inventors: Masayuki Asano, Tokyo (JP); Kazuki Miyake, Okazaki (JP); Akitsugu Sakai, Toyota (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/903,321

(22) Filed: Sep. 6, 2022

(65) Prior Publication Data

US 2023/0089908 A1 Mar. 23, 2023

(30) Foreign Application Priority Data

Sep. 17, 2021 (JP) ................. 2021-151872

(51) Int. Cl.
*B60W 40/105* (2012.01)
*B60W 30/14* (2006.01)
*B60W 50/04* (2006.01)

(52) U.S. Cl.
CPC ........ *B60W 40/105* (2013.01); *B60W 30/143* (2013.01); *B60W 50/045* (2013.01)

(58) Field of Classification Search
CPC ............. B60W 40/105; B60W 30/143; B60W 50/045; B60W 2520/105;
(Continued)

(56) References Cited

U.S. PATENT DOCUMENTS

2020/0070849 A1 3/2020 Suzuki et al.
2022/0126799 A1\* 4/2022 Arikere ............... B60T 8/17636
(Continued)

FOREIGN PATENT DOCUMENTS

EP      3 851 346 A1   7/2021
JP      2019098972 A   6/2019
(Continued)

OTHER PUBLICATIONS

The extended European Search Report issued Feb. 3, 2023, by the European Patent Office in corresponding European Patent Application No. 22188699.7-1012. (9 pages).
(Continued)

*Primary Examiner* — Brian P Sweeney
(74) *Attorney, Agent, or Firm* — BUCHANAN INGERSOLL & ROONEY PC (57) ABSTRACT

A vehicle motion controller includes a feedback controlling unit that executes feedback control in which a difference between a target acceleration corresponding to a request value from a driver assistance device and an actual acceleration of a vehicle is an input, thereby calculating a control amount used to reduce the difference, a request outputting unit that calculates a request longitudinal force based on the control amount, the request longitudinal force controlling an actuator, and an obtaining unit that obtains, as information that indicates availability, information indicating whether the at least one of the anti-lock brake control or the anti-skid control is executed, the availability being a controllable range of the longitudinal force. The feedback controlling unit keeps the control amount constant when the at least one of the anti-lock brake control or the anti-skid control is executed.

1 Claim, 5 Drawing Sheets

(58) Field of Classification Search
CPC ... B60W 2710/0666; B60W 2710/083; B60W 2710/182; B60W 2720/106; B60W 2720/30; B60W 10/04; B60W 10/184; B60T 8/175; B60T 8/17616
See application file for complete search history.

(56) References Cited

U.S. PATENT DOCUMENTS

2022/0126801 A1  4/2022  Laine et al.
2023/0047444 A1* 2/2023  Henderson .............. B60T 8/175

FOREIGN PATENT DOCUMENTS

JP   2020-019456 A   2/2020
JP   2021-107225 A   7/2021
WO   2021/144065     7/2021

OTHER PUBLICATIONS

Office Action (Notice of Reasons for Refusal) issued Sep. 5, 2023, by the Japan Patent Office in corresponding Japanese Patent Application No. 2021-151872 and an English translation of the Office Action. (14 pages).

* cited by examiner

VEHICLE MOTION CONTROLLER

BACKGROUND

1. Field

The present disclosure relates to a vehicle motion controller that controls the motion of a vehicle.

2. Description of Related Art

Japanese Laid-Open Patent Publication No. 2019-98972 discloses a vehicle including a driving device that outputs a driving force, a braking device that outputs a braking force, and an autonomous drive controller that executes autonomous driving control by controlling the driving device and the braking device. The autonomous drive controller executes feedback control to adjust the driving force and the braking force, thereby eliminating the difference between a target acceleration and an actual acceleration.

A longitudinal force acts in a longitudinal direction of the vehicle. The greater the force acting in a direction in which the vehicle accelerates, the greater a value the longitudinal force indicates. The greater a force acting in a direction in which the vehicle decelerates, the smaller a value the longitudinal force indicates. The controllable range of the longitudinal force varies depending on a situation in which the vehicle is traveling. Examples of the controllable range include a range of the longitudinal force capable of being generated by a driving device and a range of the longitudinal force capable of being generated by a braking device. In the case of the intervention of control other than autonomous driving control applied to at least one of the braking device and the driving device, the controllable range of the longitudinal force may be limited depending on the content of that control.

Even if a request that exceeds the controllable range of the longitudinal force is issued for the driving device or the braking device, a longitudinal force that reflects the request cannot be gained. If the feedback control is continued in a state where the longitudinal force cannot be gained, the control amount may excessively increase or excessively decrease. Subsequently, when the state where the requested longitudinal force cannot be gained shifts to a state where the request is in the controllable range of the longitudinal force, the time for the actual acceleration to converge to the target acceleration may increase. Thus, in a case where the feedback control disclosed in the above-described literature is executed, the vehicle needs to be controlled with the controllable range of the longitudinal force taken into account.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle motion controller according to an aspect of the present disclosure is employed in a vehicle that includes a driver assistance device that assists traveling of the vehicle and an actuator that generates a longitudinal force indicating a force that acts in a longitudinal direction of the vehicle. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount, the request longitudinal force controlling the actuator, and an obtaining unit that obtains, as availability, a range of the longitudinal force capable of being generated by the actuator, the availability being a controllable range of the longitudinal force. The feedback controlling unit prohibits the control amount from decreasing when the request longitudinal force is less than a minimum value in the availability.

A vehicle motion controller according to another aspect of the present disclosure is employed in a vehicle that includes a driver assistance device that assists traveling of the vehicle and an actuator that generates a longitudinal force indicating a force that acts in a longitudinal direction of the vehicle. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount, the request longitudinal force controlling the actuator, and an obtaining unit that obtains, as availability, a range of the longitudinal force capable of being generated by the actuator, the availability being a controllable range of the longitudinal force. The feedback controlling unit prohibits the control amount from increasing when the request longitudinal force is greater than a maximum value in the availability.

A vehicle motion controller according to a further aspect of the present disclosure is employed in a vehicle that includes a driver assistance device that assists traveling of the vehicle, an actuator that generates a longitudinal force indicating a force that acts in a longitudinal direction of the vehicle, and an actuator controller that executes traction control that prevents wheelspin of a wheel of the vehicle. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount, the request longitudinal force controlling the actuator, and an obtaining unit that obtains, as information that indicates availability, information indicating whether the traction control is executed, the availability being a controllable range of the longitudinal force. The feedback controlling unit prohibits the control amount from increasing when the traction control is executed.

A vehicle motion controller according to still another aspect of the present disclosure is employed in a vehicle that includes a driver assistance device that assists traveling of the vehicle, an actuator that generates a longitudinal force indicating a force that acts in a longitudinal direction of the vehicle, and an actuator controller that executes at least one of anti-lock brake control that prevents a wheel of the vehicle from being locked or anti-skid control that prevents the vehicle from skidding. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount, the request longitudinal force controlling the actuator, and an obtaining unit that obtains, as information that indicates availability, information indicating whether the at least one of the anti-lock brake control or the anti-skid control is executed, the availability being a controllable range of the longitudinal force. The feedback controlling unit keeps the control amount constant when the at least one of the anti-lock brake control or the anti-skid control is executed.

A vehicle motion controller according to yet another aspect of the present disclosure is employed in a vehicle that includes a driver assistance device that assists traveling of the vehicle, a driving device, and a friction braking device, the driving device and the friction braking device serving as an actuator that generates a longitudinal force indicating a force that acts in a longitudinal direction of the vehicle. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount, the request longitudinal force controlling the actuator, and an obtaining unit that obtains, as information that indicates availability, a temperature of a frictional member in the friction braking device, the availability being a controllable range of the longitudinal force. The feedback controlling unit prohibits the control amount from decreasing when the temperature is greater than or equal to a determination temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle motion controller 10 according to an embodiment will now be described with reference to FIGS. 1 to 8.

Figure 1:
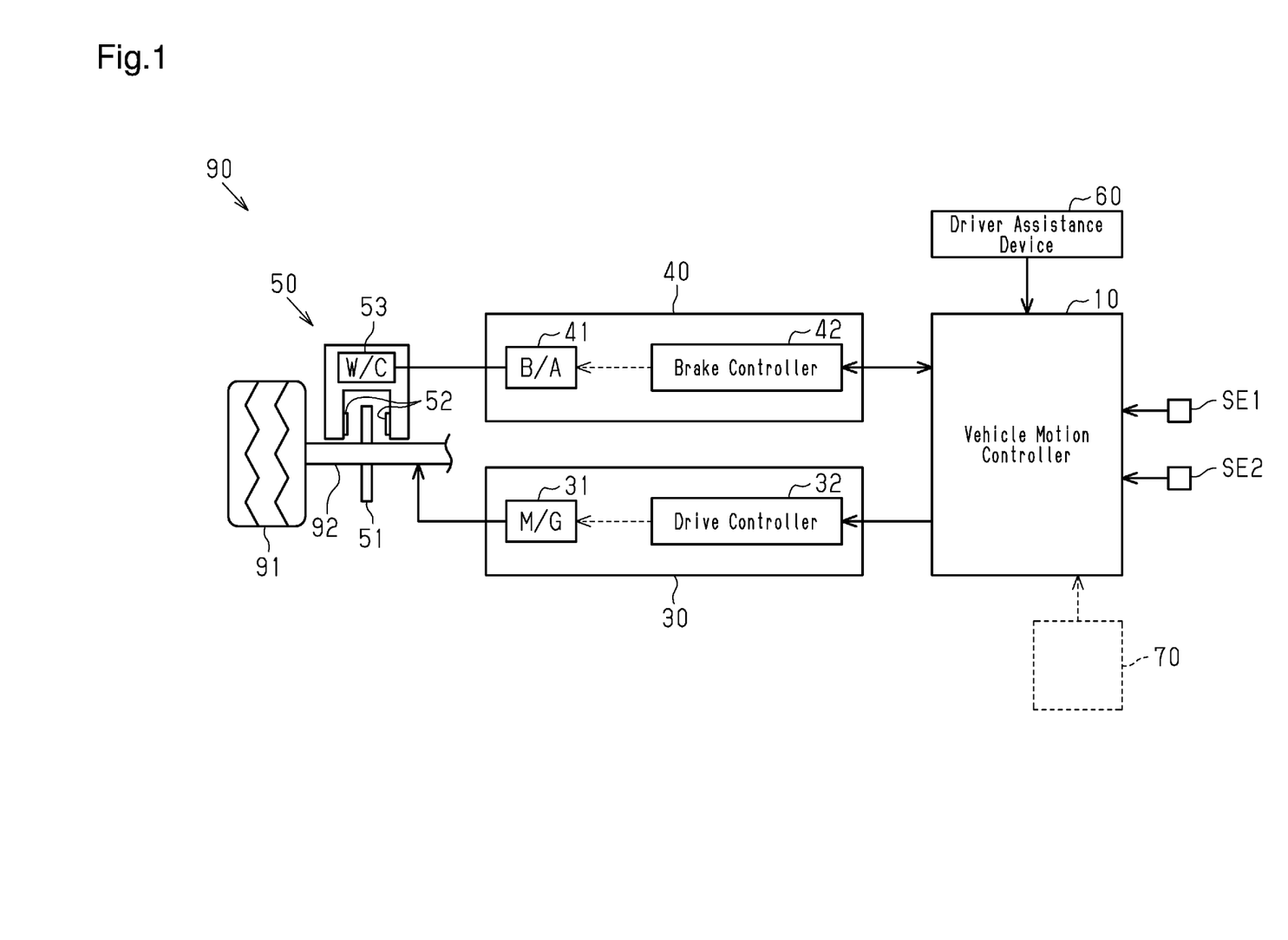
FIG. 1 is a schematic diagram showing a vehicle motion controller according to an embodiment and a vehicle controlled by the vehicle motion controller.

FIG. 1 shows a vehicle 90 that includes the vehicle motion controller 10 having a driving device 30, a braking device 40, and a driver assistance device 60.

The vehicle motion controller 10 can manage the motion of the vehicle 90. Specifically, the vehicle motion controller 10 controls the motion of the vehicle 90 by adjusting a longitudinal force that indicates a force acting in a longitudinal direction of the vehicle 90. More specifically, the vehicle motion controller 10 controls the driving device 30 and the braking device 40 so as to adjust the acceleration of the vehicle 90 in the longitudinal direction, thereby adjusting the traveling speed of the vehicle 90.

FIG. 1 shows one of the axles 92 of the vehicle 90 and one of the wheels 91 that are respectively coupled to the axles 92. Each wheel 91 is a driven wheel.

The vehicle 90 may include an interior monitoring system 70. The interior monitoring system 70 includes a monitoring device and a monitoring system controller. The monitoring device is, for example, a camera that obtains information in the vehicle 90. The monitoring system controller is a processing circuit such as CPU. The monitoring system controller can process the information obtained by the monitoring device so as to send the information to the vehicle motion controller 10.

Driver Assistance Device

Figure 2:
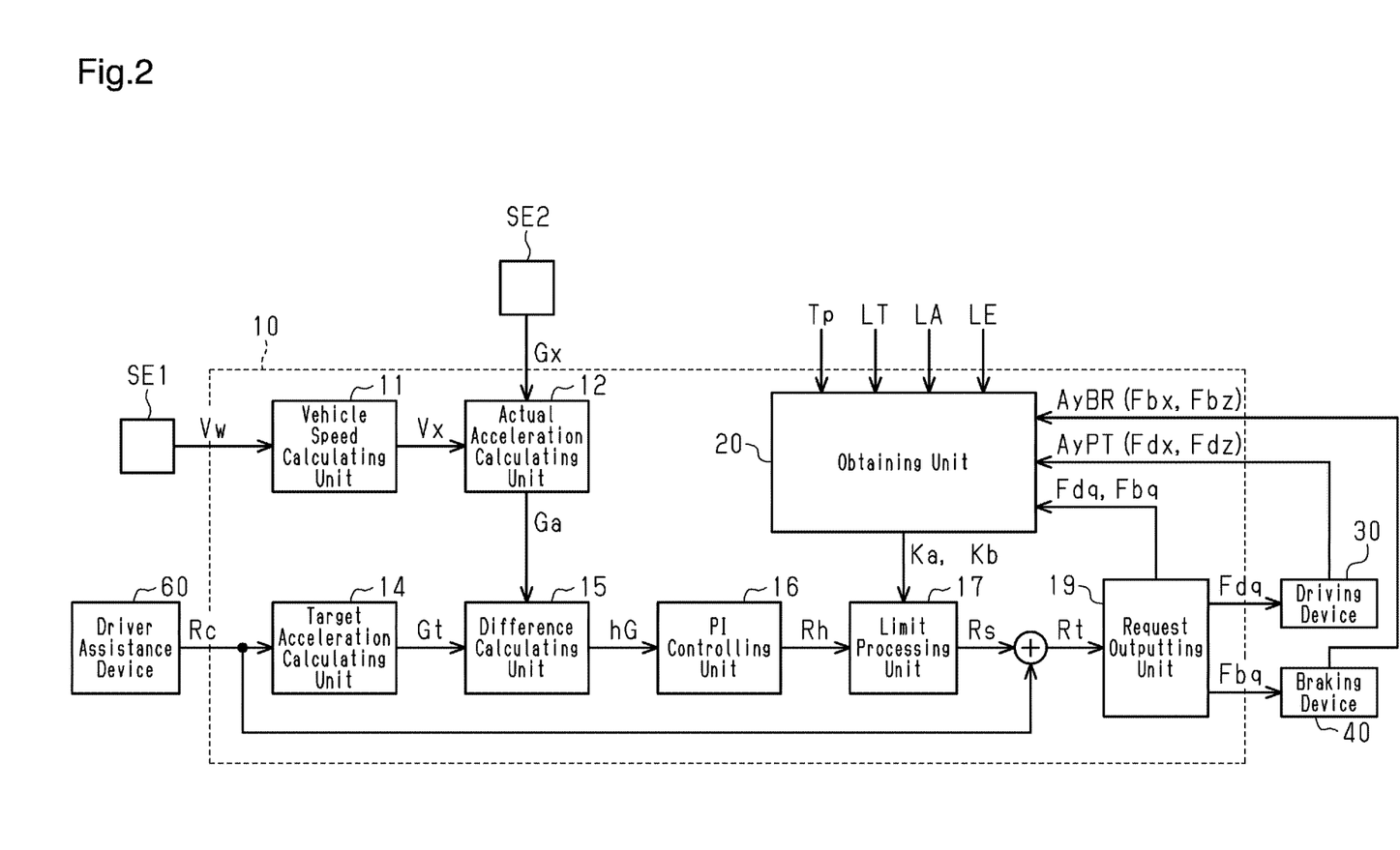
FIG. 2 is a block diagram of the vehicle motion controller shown in FIG. 1.

As shown in FIGS. 1 and 2, the driver assistance device 60 is connected to the vehicle motion controller 10. The driver assistance device 60 calculates a request value Rc used to assist the traveling of the vehicle 90. The driver assistance device 60 sends the request value Rc to the vehicle motion controller 10.

The request value Rc is a request value of the longitudinal force, which indicates a force acting in the longitudinal direction of the vehicle 90. When the request value Rc is positive, it indicates that the driver assistance device 60 requests acceleration of vehicle 90. When the request value Rc is negative, it indicates that the driver assistance device 60 requests deceleration of vehicle 90.

The driver assistance device 60 includes an obtaining device that obtains information of the surroundings of the vehicle 90. The obtaining device is, for example, a camera or a radar. The obtaining device can obtain the relative distances between the vehicle 90 and, for example, another vehicle and an obstacle that are located around the vehicle 90. The obtaining device can also obtain the shape of a road where the vehicle 90 travels and recognizing lanes. The driver assistance device 60 includes an assistance calculating unit that calculates the request value Rc. The assistance calculating unit is a processing circuit that calculates the request value Rc using the information obtained by the obtaining device.

Driving Device

The driving device 30 of the vehicle 90 is, for example, a device that generates a driving force using an electric motor. FIG. 1 shows a motor generator 31 as an actuator of the driving device 30. The motor generator 31 is connected to a battery included in the vehicle 90. The driving force is transmitted to the vehicle 90 by causing the motor generator 31 to function as an electric motor. The driving force is transmitted to the wheel 91 via the axle 92. The motor generator 31 is an example of an actuator that generates a longitudinal force. When the motor generator 31 functions as an electric generator, the vehicle 90 can receive a regenerative braking force.

The driving device 30 includes a drive controller 32, which is a processing circuit. The drive controller 32 functions to control the actuator of the driving device 30. For example, the drive controller 32 can generate the driving force by activating the motor generator 31 based on a driving request value Fdq that is sent from the vehicle motion controller 10.

The actuator of the driving device 30 is not limited to an electric motor and may include an internal combustion engine and a transmission. Alternatively, the driving device 30 may include an electric motor, an internal combustion engine, and a transmission. As another option, the actuator of the driving device 30 may be an in-wheel motor in which an electric motor is coupled to the metal component of each wheel of a vehicle.

Braking Device

The braking device 40 of the vehicle 90 is, for example, a friction braking device. FIG. 1 shows a liquid pressure braking device as an example of the friction braking device. The braking device 40 includes a braking mechanism 50 that corresponds to each wheel 91 of the vehicle 90.

The braking mechanism 50 includes a wheel cylinder 53, a rotor 51 that rotates integrally with the wheel 91, and frictional members 52 that can be pressed against the rotor 51. The braking mechanism 50 is, for example, a disc brake. The braking mechanism 50 may be a drum brake.

As shown in FIG. 1, the braking device 40, which is a liquid pressure braking device, includes a liquid pressure generator. The braking device 40 includes a brake actuator 41 to which brake fluid is supplied from the liquid pressure generator.

The brake actuator 41 is connected to each wheel cylinder 53. The liquid pressure braking device can generate a frictional braking force in correspondence with a wheel cylinder (WC) pressure, which is liquid pressure in the wheel cylinder 53 of the braking mechanism 50. In the braking mechanism 50, the higher the WC pressure, the greater the force that presses the frictional members 52 against the rotor 51, which rotates integrally with the wheel 91. The higher the WC pressure, the greater the braking force applied to the wheel 91 by each braking mechanism 50. The WC pressure is an example of a value that indicates a pressing force that presses the frictional members 52 against the rotor 51. The brake actuator 41 is an example of the actuator that generates the longitudinal force.

The braking device 40 includes a brake controller 42, which is a processing circuit. The brake controller 42 functions to control the brake actuator 41 of the braking device 40. For example, the brake controller 42 can generate the braking force by activating the brake actuator 41 based on a braking request value Fbq that is sent from the vehicle motion controller 10.

The brake controller 42 may obtain the temperatures of the frictional members 52. For example, the brake controller 42 may execute an estimating process that estimates the temperatures of the frictional members 52. The estimating process can estimate, for example, a frictional member temperature Tp based on the time during which the frictional members 52 are pressed against the rotor 51, the magnitude of the pressing force, and the time during which the frictional members 52 are separated from the rotor 51. The frictional member temperature Tp may be obtained based on a detection signal of a temperature sensor that detects the temperatures of the frictional members 52.

Vehicle Stability Control

The drive controller 32 and the brake controller 42 may function to execute vehicle stability control that stabilizes the traveling of the vehicle 90. Examples of the vehicle stability control include traction control, anti-lock brake control, and anti-skid control.

The traction control prevents acceleration slip of the driven wheels of the wheels 91 so as to prevent wheelspin of the driven wheels. In the traction control, the acceleration slip of the driven wheels is prevented by decreasing the driving force or increasing the braking force. The drive controller 32 and the brake controller 42 correspond to an actuator controller that executes the traction control.

The anti-lock brake control reduces slip amounts of the wheels 91 during braking of the vehicle 90 so as to prevent the wheels 91 from being locked. In the anti-lock brake control, the slip amounts of the wheels 91 are reduced by adjusting the braking force. The brake controller 42 corresponds to an actuator controller that executes the anti-lock brake control.

The anti-skid control reduces the slip amounts of the wheels 91 during turning of the vehicle 90 so as to prevent the vehicle 90 from skidding. In the anti-skid control, the slip amounts of the wheels 91 are reduced by adjusting the driving force and the braking force. The drive controller 32 and the brake controller 42 correspond to an actuator controller that executes the anti-skid control.

When starting the traction control, the actuator controller sets a traction control system (TCS) execution flag LT to ON. When ending the traction control, the actuator controller sets the TCS execution flag LT to OFF.

When starting the anti-lock brake control, the actuator controller sets an anti-lock brake system (ABS) execution flag LA to ON. When ending the anti-lock brake control, the actuator controller sets the ABS execution flag LA to OFF.

When starting the anti-skid control, the actuator controller sets an electronic stability control (ESC) execution flag LE to ON. When ending the anti-skid control, the actuator controller sets the ESC execution flag LE to OFF.

The vehicle stability control is the more prioritized one of the controls that activate the driving device 30 or the braking device 40. While the vehicle stability control is executed, the less prioritized control may be limited.

Longitudinal Force

In the dimension of the longitudinal force, when the value is positive, the longitudinal force acts in a direction in which the vehicle 90 is accelerated. When the value is negative, the longitudinal force acts in a direction in which the vehicle 90 is decelerated. In the dimension of the longitudinal force, as the value becomes farther from 0, it indicates that the force acting on the vehicle 90 increases.

In the driving device 30, when the driving request value Fdq is positive, the motor generator 31 is controlled such that the driving force increases as the driving request value Fdq increases. When the driving request value Fdq is 0, the driving device 30 transmits no driving force.

In the braking device 40, the brake actuator 41 is controlled such that the braking force increases as the braking request value Fbq decreases. When the braking request value Fbq is 0, the braking device 40 applies no braking force. The maximum value of the braking request value Fbq is 0.

The driving request value Fdq may be calculated as a negative value. When the driving request value Fdq is negative, it indicates that a regenerative braking force is requested, for example. In the driving device 30, when the driving request value Fdq is negative, the motor generator 31 is controlled such that the regenerative braking force increases as the driving request value Fdq decreases. In the case of using an internal combustion engine as the driving device 30, when the driving request value Fdq is negative, it indicates that engine braking is requested.

Availability

The controllable range of the longitudinal force of the vehicle 90 is referred to as availability. The availability varies depending on, for example, the state quantity of the vehicle 90 while the vehicle 90 is traveling.

The availability is defined by, for example, a transmittable range AyPT in the driving device 30. The transmittable range AyPT is a range of the longitudinal force capable of being generated by the motor generator 31 of the driving device 30. The transmittable range AyPT is calculated by, for example, the drive controller 32. The transmittable range AyPT varies depending on, for example, the amount of electric power capable of being supplied from the battery to the motor generator 31. The maximum value of the transmittable range AyPT is a first maximum longitudinal force Fdx. The minimum value of the transmittable range AyPT is a first minimum longitudinal force Fdz.

The availability is defined by, for example, a brakable range AyBR in the braking device 40. The brakable range AyBR is a range of the longitudinal force capable of being generated by the brake actuator 41 of the braking device 40. The brakable range AyBR is calculated by, for example, the brake controller 42. The brakable range AyBR varies depending on, for example, the temperature of brake fluid. The maximum value of the brakable range AyBR is a second maximum longitudinal force Fbx. The minimum value of the brakable range AyBR is a second minimum longitudinal force Fbz.

The availability is also defined by, for example, an execution state of the vehicle stability control. The availability as to control that is less prioritized than the vehicle stability control is limited in correspondence with the execution state of the vehicle stability control.

For example, the prevention of acceleration slip, which is the purpose of the traction control, may not be able to be achieved if the longitudinal force is increased during execution of the traction control. Thus, when the traction control is executed, an increase in the longitudinal force is preferably limited. In other words, the availability is preferably limited to be narrower when the traction control is executed than when the traction control is not executed. More preferably, the maximum value of the availability is set to 0.

Further, for example, the reduction of the slip amount, which is the purpose of the anti-lock brake control, may not be able to be achieved if the longitudinal force is increased or decreased during execution of the anti-lock brake control. Thus, when the anti-lock brake control is executed, an increase and a decrease in the longitudinal force is preferably limited. In other words, the availability is preferably limited to be narrower when the anti-lock brake control is executed than when the anti-lock brake control is not executed. More preferably, the maximum value and the minimum value of the availability are set to 0.

Furthermore, for example, the reduction of the slip amount, which is the purpose of the anti-skid control, may not be able to be achieved if the longitudinal force is increased or decreased during execution of the anti-skid control. Thus, when the anti-skid control is executed, an increase and a decrease in the longitudinal force is preferably limited. In other words, the availability is preferably limited to be narrower when the anti-skid control is executed than when the anti-skid control is not executed. More preferably, the maximum value and the minimum value of the availability are set to 0.

The availability is also defined by, for example, the frictional member temperature Tp. In the braking device 40 serving as the friction braking device, changes depending on the frictional member temperature Tp may occur in the relationship between the pressing force that presses the frictional members 52 against the rotor 51 and the braking force that actually acts on the wheels 91 in correspondence with that pressing force. Particularly, in a case where the frictional member temperature Tp becomes excessively high, the braking force does not easily increase even if the pressing force is increased. That is, the longitudinal force may not be able to be reduced by activating the braking device 40. Thus, the value of the second minimum longitudinal force Fbz, which is the minimum value of the brakable range AyBR, becomes closer to 0 when the frictional member temperature Tp is high than when the frictional member temperature Tp is low.

As described above, the transmittable range AyPT, the brakable range AyBR, the execution state of the vehicle stability control, and the frictional member temperature Tp are examples of the information that indicates the availability, which is the controllable range of the longitudinal force of the vehicle 90. Depending on the execution state of the vehicle stability control and the frictional member temperature Tp, the availability may be limited to be narrower than the transmittable range AyPT or the brakable range AyBR.

Sensors

The vehicle 90 includes various types of sensors. FIGS. 1 and 2 show a wheel speed sensor SE1 and a longitudinal acceleration sensor SE2 as examples of the various sensors. Detection signals from the various sensors are input to the vehicle motion controller 10.

The wheel speed sensor SE1 detects a wheel speed Vw. The wheel speed sensor SE1 is disposed at each wheel 91. Based on the detection signal from the wheel speed sensor SE1, the vehicle motion controller 10 can calculate the wheel speed Vw of each wheel 91. Bsed on each wheel speed Vw, the vehicle motion controller 10 can calculate a vehicle speed Vx. The vehicle speed Vx indicates the traveling speed of the vehicle 90.

The longitudinal acceleration sensor SE2 detects the acceleration in the longitudinal direction of the vehicle 90. The vehicle motion controller 10 can obtain the detection signal from the longitudinal acceleration sensor SE2 as an acceleration detected value Gx.

Vehicle Motion Controller

The vehicle motion controller 10 will now be described. The vehicle motion controller 10 executes driver assistance control that automatically adjusts the traveling speed of the vehicle 90 based on the request value Rc from the driver assistance device 60. Examples of the driver assistance control include control of autonomous driving, autonomous parking, adaptive cruise control, lane keep assist, and collision avoidance braking. The driver assistance control is less prioritized than the vehicle stability control.

The vehicle motion controller 10 is connected to the drive controller 32 and the brake controller 42. Information can be exchanged between the vehicle motion controller 10, the drive controller 32, and the brake controller 42. The drive controller 32 and the brake controller 42 can exchange information via the vehicle motion controller 10. The drive controller 32 and the brake controller 42 may be directly connected to each other. In this case, information can be exchanged between the drive controller 32 and the brake controller 42.

The vehicle motion controller 10 is a processing circuit including functional units that execute various types of control. FIG. 2 shows a vehicle speed calculating unit 11, an actual acceleration calculating unit 12, a target acceleration calculating unit 14, a difference calculating unit 15, a proportional-integral (PI) controlling unit 16, a limit processing unit 17, an obtaining unit 20, and a request outputting unit 19 as examples of the functional units. The functional units of the vehicle motion controller 10 can exchange information with each other.

The vehicle speed calculating unit 11 calculates the traveling speed of the vehicle 90, namely, the vehicle speed Vx, from the wheel speed Vw, which is based on the detection signal of the wheel speed sensor SE1.

The actual acceleration calculating unit 12 calculates an actual acceleration Ga from a value obtained by differentiating the vehicle speed Vx with respect to time and from the acceleration detected value Gx, which is based on the detection signal of the longitudinal acceleration sensor SE2.

Based on the request value Rc sent from the driver assistance device 60, the target acceleration calculating unit 14 calculates a target acceleration Gt. More specifically, the target acceleration calculating unit 14 calculates the target acceleration Gt by converting the request value Rc, which has a dimension of the longitudinal force, into an acceleration. When the vehicle 90 is requested to accelerate, the target acceleration Gt has a positive value. When the vehicle 90 is requested to decelerate, the target acceleration Gt has a negative value.

The difference calculating unit 15 calculates a difference hG in the acceleration by subtracting the actual acceleration Ga, which has been calculated by the actual acceleration calculating unit 12, from the target acceleration Gt, which has been calculated by the target acceleration calculating unit 14.

The PI controlling unit 16 and the limit processing unit 17 correspond to a feedback controlling unit. Based on the difference hG, the feedback controlling unit calculates a feedback control amount used to reduce the difference hG. The feedback controlling unit outputs a limit control amount Rs as the feedback control amount.

The request outputting unit 19 calculates a request longitudinal force used to control the driving device 30 and the braking device 40. The request outputting unit 19 outputs the driving request value Fdq and the braking request value Fbq as the request longitudinal force. In the vehicle motion controller 10, the sum of the request value Rc and the limit control amount Rs is input to the request outputting unit 19 as a corrected request value Rt. That is, the greater the limit control amount Rs, the greater the corrected request value Rt. The smaller the limit control amount Rs, the smaller the corrected request value Rt. The request outputting unit 19 calculates the driving request value Fdq and the braking request value Fbq in correspondence with the corrected request value Rt. The request outputting unit 19 outputs the driving request value Fdq to the driving device 30. The request outputting unit 19 outputs the braking request value Fbq to the braking device 40.

The obtaining unit 20 obtains the availability. More specifically, the obtaining unit 20 can obtain the following information as the information indicating the availability. The obtaining unit 20 obtains the first maximum longitudinal force Fdx and the first minimum longitudinal force Fdz of the transmittable range AyPT from the drive controller 32 of the driving device 30. The obtaining unit 20 obtains the second maximum longitudinal force Fbx and the second minimum longitudinal force Fbz of the brakable range AyBR from the brake controller 42 of the braking device 40. The obtaining unit 20 obtains the TCS execution flag LT, the ABS execution flag LA, and the ESC execution flag LE from the actuator controller. The obtaining unit 20 obtains the frictional member temperature Tp from the brake controller 42. The obtaining unit 20 obtains the driving request value Fdq and the braking request value Fbq from the request outputting unit 19.

The obtaining unit 20 activates an increase prohibiting flag Ka and a decrease prohibiting flag Kb in correspondence with the obtained availability and the request longitudinal force. The flag activation by the obtaining unit 20 will be described in detail later.

Feedback Controlling Unit

The feedback controlling unit will now be described in more detail.

As shown in FIG. 2, the PI controlling unit 16 outputs a feedback (FB) control amount Rh based on the difference hG. The calculation executed by the PI controlling unit 16 includes proportional control and integral control. The PI controlling unit 16 calculates the FB control amount Rh as the feedback control amount, which is used to reduce the difference hG. While calculating the FB control amount Rh, the PI controlling unit 16 converts the value of the FB control amount Rh into the dimension of the longitudinal force.

In the feedback controlling unit, while at least one of the increase prohibiting flag Ka and the decrease prohibiting flag Kb is ON, the PI controlling unit 16 suspends the integral control. Even during a period in which the integral control is suspended, the PI controlling unit 16 continues calculation of the FB control amount Rh. That is, an integral term is not added to the FB control amount Rh calculated in this period.

As shown in FIG. 2, the FB control amount Rh is input to the limit processing unit 17. The limit processing unit 17 outputs the limit control amount Rs in correspondence with the increase prohibiting flag Ka and the decrease prohibiting flag Kb.

When the increase prohibiting flag Ka and the decrease prohibiting flag Kb are OFF, the limit processing unit 17 outputs the input FB control amount Rh as the limit control amount Rs.

When the increase prohibiting flag Ka is ON, the limit processing unit 17 prohibits the feedback control amount from increasing. This process will now be described in detail. When the FB control amount Rh is input to the limit processing unit 17 from the PI controlling unit 16 with the increase prohibiting flag Ka ON, the limit processing unit 17 compares the input FB control amount Rh with the limit control amount Rs that was previously output. When the input FB control amount Rh is greater than or equal to the limit control amount Rs that was previously output, the limit processing unit 17 outputs a limit control amount Rs having the same value as the limit control amount Rs that was previously output. When the input FB control amount Rh is less than the limit control amount Rs that was previously output, the limit processing unit 17 outputs the input FB control amount Rh as the limit control amount Rs.

When the decrease prohibiting flag Kb is ON, the limit processing unit 17 prohibits the feedback control amount from decreasing. This process will now be described in detail. When the FB control amount Rh is input to the limit processing unit 17 from the PI controlling unit 16 with the decrease prohibiting flag Kb ON, the limit processing unit 17 compares the input FB control amount Rh with the limit control amount Rs that was previously output. When the input FB control amount Rh is less than or equal to the limit control amount Rs that was previously output, the limit processing unit 17 outputs a limit control amount Rs having the same value as the limit control amount Rs that was previously output. When the input FB control amount Rh is greater than the limit control amount Rs that was previously output, the limit processing unit 17 outputs the input FB control amount Rh as the limit control amount Rs.

Obtaining Unit

The function of the obtaining unit 20 will now be described in detail with examples.

Examples of cases where the obtaining unit 20 activates the flags based on the transmittable range AyPT and the driving request value Fdq will now be described with reference to FIGS. 3 and 4.

Figure 3:
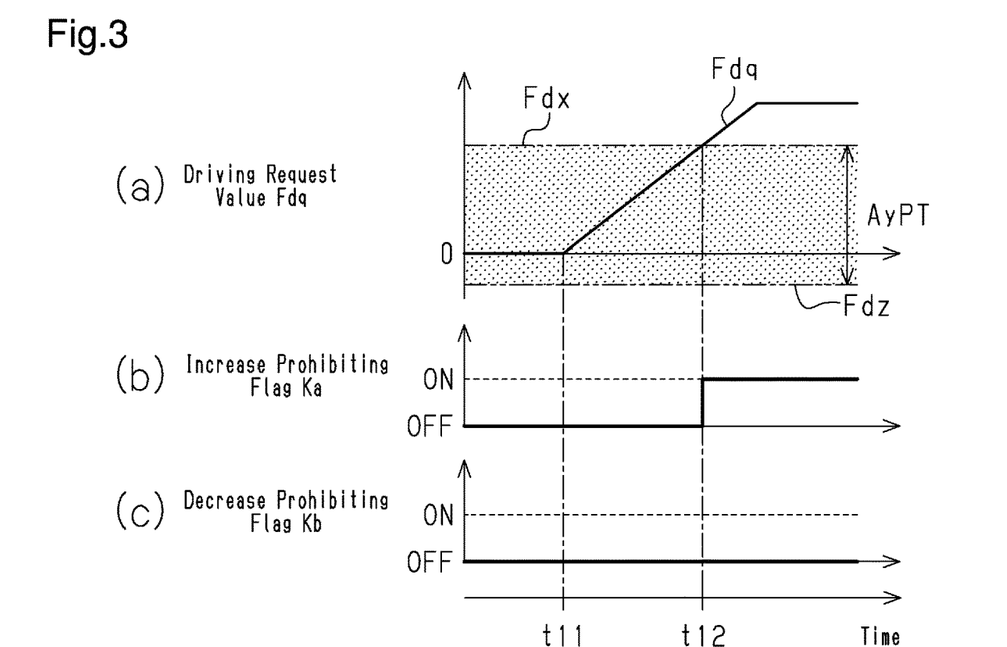
FIG. 3 is a graph illustrating a process executed by the vehicle motion controller shown in FIG. 1.

FIG. 3 is an example of a case where the driving request value Fdq increases during execution of the driver assistance control. Section (a) of FIG. 3 shows the transmittable range AyPT and the driving request value Fdq that are input to the obtaining unit 20. As shown in section (a) of FIG. 3, the driving request value Fdq is 0 in a period prior to the point in time t11. After the point in time t11, the driving request value Fdq increases. After the point in time t12, the driving request value Fdq increasing after the point in time t11 is greater than the first maximum longitudinal force Fdx.

When the driving request value Fdq is greater than the first maximum longitudinal force Fdx in the transmittable range AyPT, the obtaining unit 20 determines that the driving request value Fdq is greater than the maximum value of the availability. Then, the obtaining unit 20 sets the increase prohibiting flag Ka to ON. That is, the obtaining unit 20 determines that the driving request value Fdq is greater than the maximum value of the availability at the point in time t12. Then, as shown in section (b) of FIG. 3, the obtaining unit 20 sets the increase prohibiting flag Ka to ON at the point in time t12. As a result, the limit processing unit 17 prohibits the feedback control amount from increasing after the point in time t12.

When the driving request value Fdq decreases so that the driving request value Fdq is less than or equal to the first maximum longitudinal force Fdx, the obtaining unit 20 determines that the driving request value Fdq is in the range of the availability. Then, the obtaining unit 20 sets the increase prohibiting flag Ka to OFF.

In the example shown in FIG. 3, the decrease prohibiting flag Kb shown in section (c) of FIG. 3 is not activated by the obtaining unit 20. That is, the decrease prohibiting flag Kb remains OFF after the point in time t12. As a result, the limit processing unit 17 does not prohibit the feedback control amount from decreasing. Thus, the feedback control amount is permitted to decrease even after the point in time t12.

Figure 4:
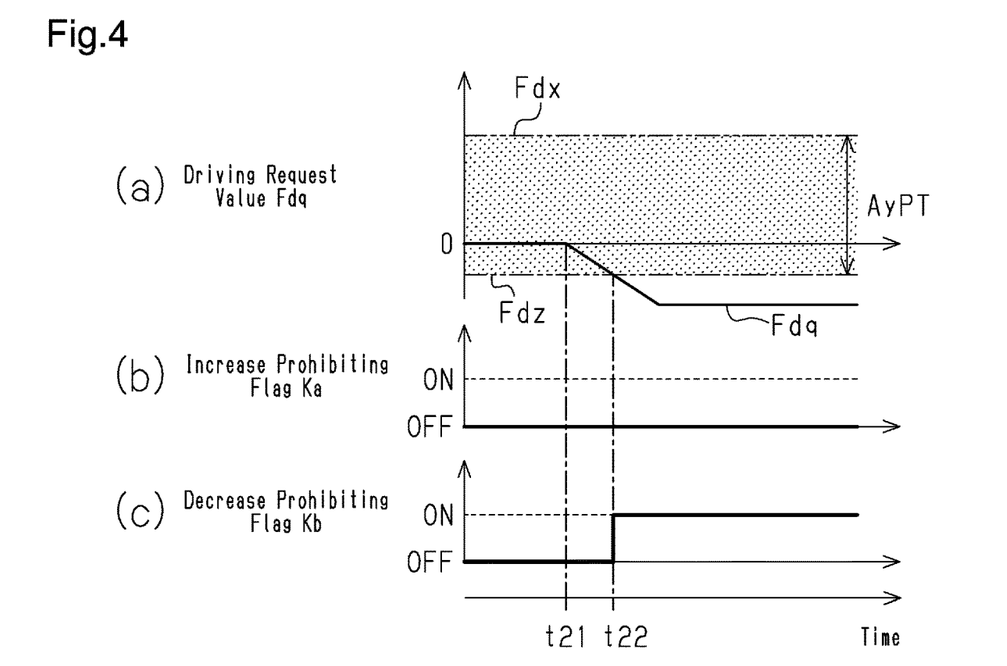
FIG. 4 is a graph illustrating a process executed by the vehicle motion controller shown in FIG. 1.

FIG. 4 is an example of a case where the driving request value Fdq decreases during execution of the driver assistance control. Section (a) of FIG. 4 shows the transmittable range AyPT and the driving request value Fdq that are input to the obtaining unit 20. As shown in section (a) of FIG. 4, the driving request value Fdq is 0 in a period prior to the point in time t21. After the point in time t21, the driving request value Fdq decreases. After the point in time t22, the driving request value Fdq decreasing after the point in time t21 is less than the first minimum longitudinal force Fdz.

When the driving request value Fdq is less than the first minimum longitudinal force Fdz in the transmittable range AyPT, the obtaining unit 20 determines that the driving request value Fdq is less than the minimum value of the availability. Then, the obtaining unit 20 sets the decrease prohibiting flag Kb to ON. That is, the obtaining unit 20 determines that the driving request value Fdq is less than the minimum value of the availability at the point in time t22. As shown in section (c) of FIG. 4, the obtaining unit 20 sets the decrease prohibiting flag Kb to ON at the point in time t22. As a result, the limit processing unit 17 prohibits the feedback control amount from decreasing after the point in time t22.

When the driving request value Fdq increases so that the driving request value Fdq is greater than or equal to the first minimum longitudinal force Fdz, the obtaining unit 20 determines that the driving request value Fdq is in the range of the availability. Then, the obtaining unit 20 sets the decrease prohibiting flag Kb to OFF.

In the example shown in FIG. 4, the increase prohibiting flag Ka shown in section (b) of FIG. 4 is not activated by the obtaining unit 20. That is, the increase prohibiting flag Ka remains OFF after the point in time t22. As a result, the limit processing unit 17 does not prohibit the feedback control amount from increasing. Thus, the feedback control amount is permitted to increase even after the point in time t22.

An example of a case where the obtaining unit 20 activates the flags based on the brakable range AyBR and the braking request value Fbq will now be described with reference to FIG. 5.

Figure 5:
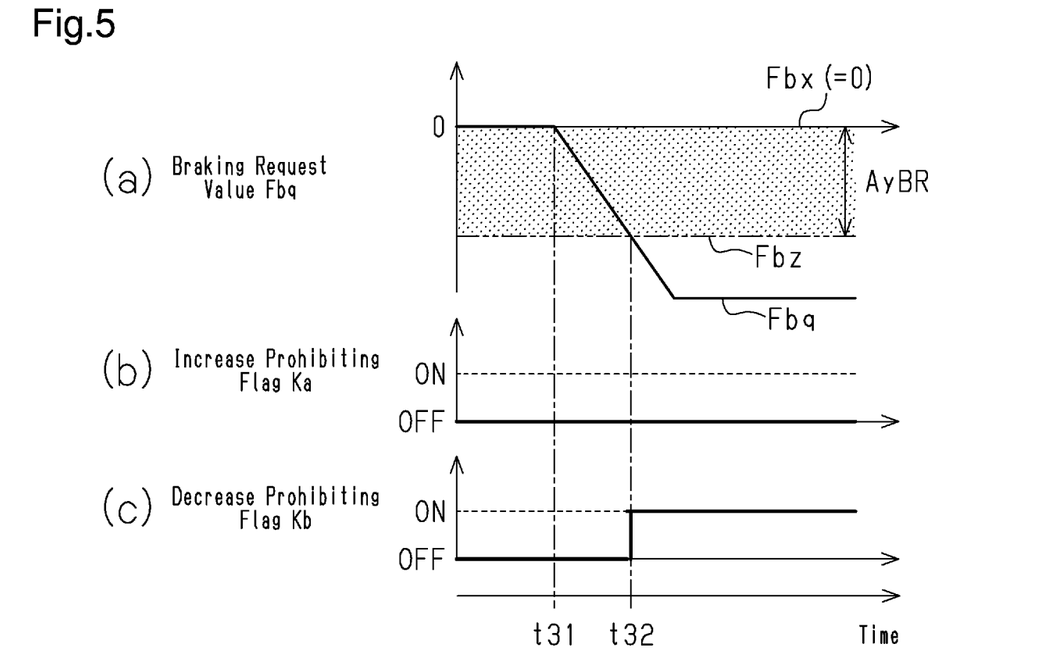
FIG. 5 is a graph illustrating a process executed by the vehicle motion controller shown in FIG. 1.

FIG. 5 is an example of a case where the braking request value Fbq decreases during execution of the driver assistance control. Section (a) of FIG. 5 shows the brakable range AyBR and the braking request value Fbq that are input to the obtaining unit 20. As shown in section (a) of FIG. 5, the braking request value Fbq is 0 in a period prior to the point in time t31. After the point in time t31, the braking request value Fbq decreases. After the point in time t32, the braking request value Fbq decreasing after the point in time t31 is less than the second minimum longitudinal force Fbz.

When the braking request value Fbq is less than the second minimum longitudinal force Fbz in the brakable range AyBR, the obtaining unit 20 determines that the braking request value Fbq is less than the minimum value of the availability. Then, the obtaining unit 20 sets the decrease prohibiting flag Kb to ON. That is, the obtaining unit 20 determines that the braking request value Fbq is less than the minimum value of the availability at the point in time t32. As shown in section (c) of FIG. 5, the obtaining unit 20 sets the decrease prohibiting flag Kb to ON at the point in time t32. As a result, the limit processing unit 17 prohibits the feedback control amount from decreasing after the point in time t32.

When the braking request value Fbq increases so that the braking request value Fbq is greater than or equal to the second minimum longitudinal force Fbz, the obtaining unit 20 determines that the braking request value Fbq is in the range of the availability. Then, the obtaining unit 20 sets the decrease prohibiting flag Kb to OFF.

In the example shown in FIG. 5, the increase prohibiting flag Ka shown in section (b) of FIG. 5 is not activated by the obtaining unit 20. That is, the increase prohibiting flag Ka remains OFF after the point in time t32. As a result, the limit processing unit 17 does not prohibit the feedback control amount from increasing. Thus, the feedback control amount is permitted to increase even after the point in time t32.

In the examples shown in FIGS. 3 to 5, it is assumed that any of the vehicle stability controls are not executed. Further, in the examples shown in FIGS. 3 to 5, it is assumed that the frictional member temperature Tp is lower than a determination temperature Tx.

Figure 6:
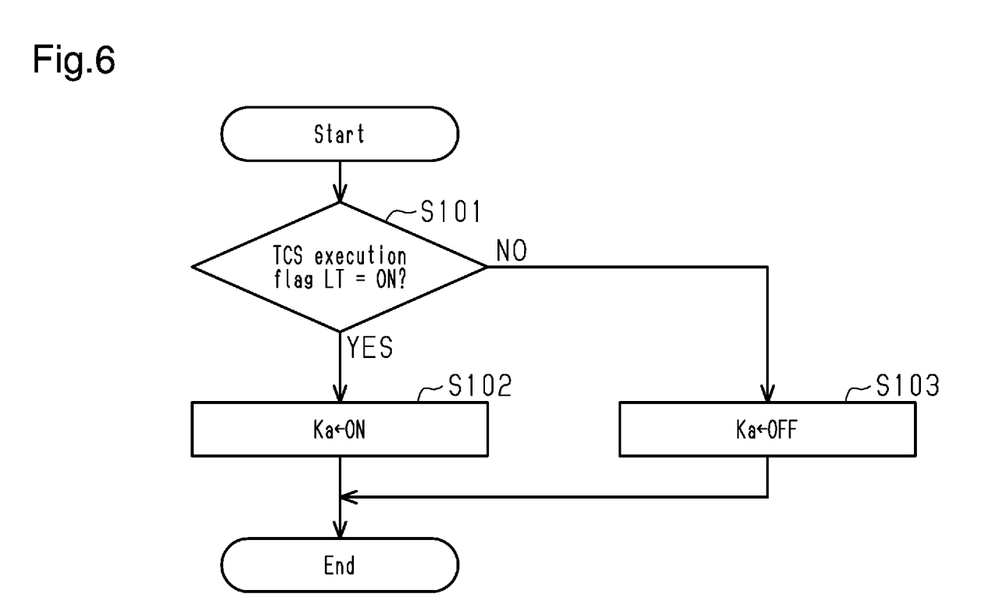
FIG. 6 is a flowchart illustrating the flow of a process executed by the vehicle motion controller shown in FIG. 1.

An example of a case where the obtaining unit 20 activates the flags based on the execution state of the traction control will now be described with reference to FIG. 6. FIG. 6 illustrates the flow of a process executed by the obtaining unit 20. This processing routine is repeatedly executed in predetermined cycles when the driver assistance control is executed.

When the processing routine is started, the obtaining unit 20 first determines in step S101 whether the TCS execution flag LT is set to ON. When the TCS execution flag LT is set to ON (S101: YES), the obtaining unit 20 advances the process to step S102. In step S102, the obtaining unit 20 sets the increase prohibiting flag Ka to ON. Subsequently, the obtaining unit 20 ends the processing routine. As a result, the limit processing unit 17 prohibits the feedback control amount from increasing. At this time, the obtaining unit 20 does not activate the decrease prohibiting flag Kb. Thus, the decrease prohibiting flag Kb is OFF, which has an initial value. That is, the limit processing unit 17 permits the feedback control amount to decrease.

In the process of step S101, when the TCS execution flag LT is not set to ON, that is, when the TCS execution flag LT is set to OFF (S101: NO), the obtaining unit 20 advances the process to step S103. In step S103, the obtaining unit 20 sets the increase prohibiting flag Ka to OFF. Subsequently, the obtaining unit 20 ends the processing routine. As a result, the limit processing unit 17 permits the feedback control amount to increase.

Figure 7:
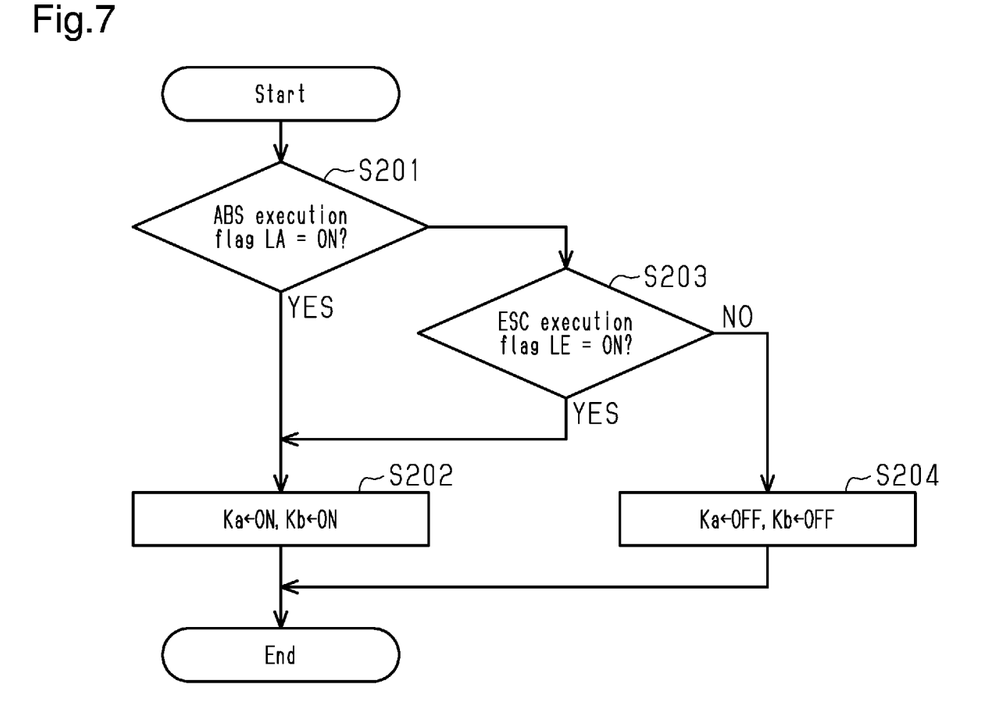
FIG. 7 is a flowchart illustrating the flow of a process executed by the vehicle motion controller shown in FIG. 1.

An example of a case where the obtaining unit 20 activates the flags based on the execution state of the anti-lock brake control or the anti-skid control will now be described with reference to FIG. 7. FIG. 7 illustrates the flow of a process executed by the obtaining unit 20. This processing routine is repeatedly executed in predetermined cycles when the driver assistance control is executed.

When the processing routine is started, the obtaining unit 20 first determines in step S201 whether the ABS execution flag LA is set to ON. When the ABS execution flag LA is set to ON (S201: YES), the obtaining unit 20 advances the process to step S202. In step S202, the obtaining unit 20 sets the increase prohibiting flag Ka and the decrease prohibiting flag Kb to ON. Subsequently, the obtaining unit 20 ends the processing routine. As a result, the limit processing unit 17 prohibits the feedback control amount from increasing and decreasing. That is, the limit processing unit 17 keeps the feedback control amount constant.

In the process of step S201, when the ABS execution flag LA is not set to ON, that is, when the ABS execution flag LA is set to OFF (S201: NO), the obtaining unit 20 advances the process to step S203. In step S203, the obtaining unit 20 determines whether the ESC execution flag LE is set to ON. When the ESC execution flag LE is set to ON (S203: YES), the obtaining unit 20 advances the process to step S202. That is, the obtaining unit 20 sets the increase prohibiting flag Ka and the decrease prohibiting flag Kb to ON. As a result, the limit processing unit 17 prohibits the feedback control amount from increasing and decreasing. That is, the limit processing unit 17 keeps the feedback control amount constant.

In the process of step S203, when the ESC execution flag LE is not set to ON, that is, when the ESC execution flag LE is set to OFF (S203: NO), the obtaining unit 20 advances the process to step S204. In step S204, the obtaining unit 20 sets the increase prohibiting flag Ka and the decrease prohibiting flag Kb to OFF. Subsequently, the obtaining unit 20 ends the processing routine. As a result, the limit processing unit 17 permits the feedback control amount to increase and decrease.

Figure 8:
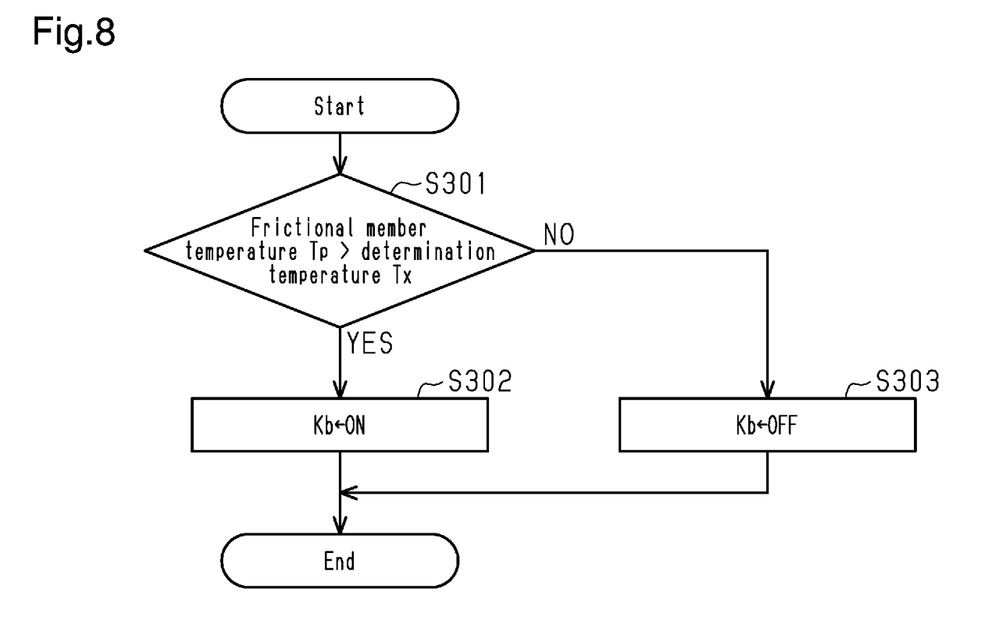
FIG. 8 is a flowchart illustrating the flow of a process executed by the vehicle motion controller shown in FIG. 1.

An example of a case where the obtaining unit 20 activates the flags based on the temperatures of the frictional members 52 will now be described with reference to FIG. 8. FIG. 8 illustrates the flow of a process executed by the obtaining unit 20. This processing routine is repeatedly executed in predetermined cycles when the driver assistance control is executed.

When the processing routine is started, the obtaining unit 20 first determines in step S301 whether the frictional member temperature Tp is greater than or equal to the determination temperature Tx. The determination temperature Tx has a value stored in the obtaining unit 20 in order to determine whether the frictional member temperature Tp is excessively increasing. The determination temperature Tx is preset based on, for example, experiments.

In the process of step S301, when the frictional member temperature Tp is greater than or equal to the determination temperature Tx (S301: YES), the obtaining unit 20 advances the process to step S302. In step S302, the obtaining unit 20 sets the decrease prohibiting flag Kb to ON. Subsequently, the obtaining unit 20 ends the processing routine. As a result, the limit processing unit 17 prohibits the feedback control amount from decreasing. At this time, the obtaining unit 20 does not activate the increase prohibiting flag Ka. Thus, the increase prohibiting flag Ka is OFF, which has an initial value. That is, the limit processing unit 17 permits the feedback control amount to increase.

In the process of step S301, when the frictional member temperature Tp is lower than the determination temperature Tx (S301: NO), the obtaining unit 20 advances the process to step S303. In step S303, the obtaining unit 20 sets the decrease prohibiting flag Kb to OFF. Subsequently, the obtaining unit 20 ends the processing routine. As a result, the limit processing unit 17 permits the feedback control amount to decrease.

Operation and Advantages

The operation and advantages of the present embodiment will now be described.

As illustrated in FIG. 3, when the driving request value Fdq is greater than the first maximum longitudinal force Fdx, the longitudinal force corresponding to the driving request value Fdq cannot be gained. If the feedback control amount is permitted to increase in this state, the feedback control amount may be further increased in a state where the longitudinal force is not increased. In such a case, feedback control amount unnecessarily increases without an increase in the longitudinal force that actually acts on the vehicle 90. An excessive increase in the feedback control amount may hinder the actual acceleration Ga from converging to the target acceleration Gt. In addition, an excessive increase in the feedback control amount may cause the actual acceleration Ga to vary suddenly when the longitudinal force corresponding to the driving request value Fdq becomes able to be gained.

In this regard, the vehicle motion controller 10 prohibits the feedback control amount from increasing when the driving request value Fdq is greater than the first maximum longitudinal force Fdx. This prevents the feedback control amount from excessively increasing. Thus, the feedback control is executed with the availability taken into account.

As illustrated in FIG. 4, when the driving request value Fdq is less than the first minimum longitudinal force Fdz, the longitudinal force corresponding to the driving request value Fdq cannot be gained. If the feedback control amount is permitted to decrease in this state, the feedback control amount may be further decreased in a state where the longitudinal force is not decreased. In such a case, the feedback control amount unnecessarily decreases without a decrease in the longitudinal force that actually acts on the vehicle 90. An excessive decrease in the feedback control amount may hinder the actual acceleration Ga from converging to the target acceleration Gt. In addition, an excessive decrease in the feedback control amount may cause the actual acceleration Ga to vary suddenly when the longitudinal force corresponding to the driving request value Fdq becomes able to be gained.

In this regard, the vehicle motion controller 10 prohibits the feedback control amount from decreasing when the driving request value Fdq is less than the first minimum longitudinal force Fdz. This prevents the feedback control amount from excessively decreasing. Thus, the feedback control is executed with the availability taken into account.

As illustrated in FIG. 5, when the braking request value Fbq is less than the second minimum longitudinal force Fbz, the longitudinal force corresponding to the braking request value Fbq cannot be gained. If the feedback control amount is permitted to decrease in this state, the feedback control amount may be further decreased in a state where the longitudinal force is not decreased. In such a case, the feedback control amount unnecessarily decreases without a decrease in the longitudinal force that actually acts on the vehicle 90. An excessive decrease in the feedback control amount may hinder the actual acceleration Ga from converging to the target acceleration Gt. In addition, an excessive decrease in the feedback control amount may cause the actual acceleration Ga to vary suddenly when the longitudinal force corresponding to the braking request value Fbq becomes able to be gained.

In this regard, the vehicle motion controller 10 prohibits the feedback control amount from decreasing when the braking request value Fbq is less than the second minimum longitudinal force Fbz. This prevents the feedback control amount from excessively decreasing. Thus, the feedback control is executed with the availability taken into account.

If the traction control is executed and the feedback control amount is permitted to increase, the feedback control amount may be further increased in a state where the longitudinal force is not increased. In such a case, the feedback control amount unnecessarily increases without an increase in the longitudinal force that actually acts on the vehicle 90. An excessive increase in the feedback control amount may hinder the actual acceleration Ga from converging to the target acceleration Gt.

In this regard, when the traction control is executed, the vehicle motion controller 10 determines that the request longitudinal force is outside the range of the availability and determines that the control according to the request longitudinal force cannot be executed. When the traction control is executed, the vehicle motion controller 10 prohibits the feedback control amount from increasing. This prevents the feedback control amount from excessively increasing. Thus, the feedback control is executed with the availability taken into account. Additionally, the time for the actual acceleration Ga to converge to the target acceleration Gt is prevented from increasing in the feedback control executed subsequent to the end of the traction control.

If at least one of the anti-lock brake control and the anti-skid control is executed and the feedback control amount is permitted to increase and decrease, the feedback control amount may be further increased or decreased in a state where the longitudinal force is not increased or decreased. In such a case, the feedback control amount unnecessarily increases or decreases without an increase or decrease in the longitudinal force that actually acts on the vehicle 90. An excessive increase or excessive decrease in the feedback control amount may hinder the actual acceleration Ga from converging to the target acceleration Gt.

In this regard, when at least one of the anti-lock brake control or the anti-skid control is executed, the vehicle motion controller 10 determines that the request longitudinal force is outside the range of the availability and determines that the control according to the request longitudinal force cannot be executed. When at least one of the anti-lock brake control and the anti-skid control is executed, the feedback control amount is kept constant. This prevents the feedback control amount from excessively increasing or excessively decreasing. Thus, the feedback control is executed with the availability taken into account. Additionally, the time for the actual acceleration Ga to converge to the target acceleration Gt is prevented from increasing in the feedback control executed subsequent to the end of the anti-lock brake control or the anti-skid control.

In the friction braking device, in a case where the frictional member temperature Tp becomes excessively high, the braking force does not easily increase even if the pressing force is increased. That is, the longitudinal force may not be able to be reduced by activating the friction braking device. If the feedback control amount is permitted to decrease in this state, the feedback control amount may be further decreased in a state where the longitudinal force is not decreased. In such a case, the feedback control amount unnecessarily decreases without a decrease in the longitudinal force that actually acts on the vehicle 90. An excessive decrease in the feedback control amount may hinder the actual acceleration Ga from converging to the target acceleration Gt.

In this regard, when the frictional member temperature Tp is greater than or equal to the determination temperature Tx, the vehicle motion controller 10 determines that the request longitudinal force is outside the range of the availability and determines that the control according to the request longitudinal force cannot be executed. When the frictional member temperature Tp is greater than or equal to the determination temperature Tx, the vehicle motion controller 10 prohibits the feedback control amount from decreasing. This prevents the feedback control amount from excessively decreasing. Thus, the feedback control is executed with the availability taken into account. Further, prohibiting the feedback control amount from decreasing prevents situations in which the braking request value Fbq is decreased; that is, prevents situations in which the braking force is increased. This prevents the frictional member temperature Tp from further increasing.

Even when the request longitudinal force is outside the range of the availability, the vehicle motion controller 10 continues the feedback control. More specifically, even when the request longitudinal force is outside the range of the availability, the feedback controlling unit continues to calculate the FB control amount Rh. Thus, after the request longitudinal force returns to the inside of the range of the availability, the feedback control that reduces the difference hG between the target acceleration Gt and the actual acceleration Ga is executed continuously.

When the request longitudinal force in the driver assistance control is outside the range of the availability, the vehicle motion controller 10 suspends the integral control. Thus, the FB control amount Rh is unaffected by the elapse of time in a period in which the request longitudinal force is outside the range of the availability. This allows the feedback control to be executed continuously.

Modifications

The above-described embodiment may be modified as follows. The above-described embodiment and the following modifications may be implemented in combination with each other as long as technical contradiction does not occur.

A replacement request value Rr, based on information from the interior monitoring system 70, may be input to the vehicle motion controller 10. The replacement request value Rr is a request value of the longitudinal force. The replacement request value Rr is output from the interior monitoring system 70 when the driver is unable to operate the vehicle 90. When the replacement request value Rr is input to the vehicle motion controller 10, the target acceleration Gt may be calculated based on the replacement request value Rr instead of the request value from the driver assistance device 60.

In the above-described embodiment, when anti-lock brake control is executed, the feedback control amount is kept constant. Instead, when anti-lock brake control is executed, the feedback control amount may be permitted to increase while the feedback control amount is prevented from decreasing.

In the above-described embodiment, when the traction control is executed, the feedback control amount is prohibited from increasing. Instead, when the traction control is executed, the feedback control amount may be prohibited from increasing and decreasing. That is, when the traction control is executed, the feedback control amount may be kept constant.

In the above-described embodiment, when the frictional member temperature Tp is greater than or equal to the determination temperature Tx, the feedback control amount is prevented from decreasing. Instead, when the frictional member temperature Tp increases at a speed that is greater than or equal to a given determination speed, the feedback control amount may be prevented from decreasing.

In the above-described embodiment, the request value Rc has a dimension of the longitudinal force. The request value from the driver assistance device 60 simply needs to correlate with the longitudinal force. The request value may have a dimension of, for example, an acceleration. In this case, the vehicle motion controller 10 does not need to calculate the target acceleration Gt and thus does not have to include the target acceleration calculating unit 14. Alternatively, the request value may have a dimension of axle torque.

The feedback controlling unit of the above-described embodiment is an example. The process that prohibits the feedback control amount from increasing or decreasing executed by the feedback controlling unit is not limited to the process explained in the above-described embodiment.

The vehicle motion controller 10, the drive controller 32, the brake controller 42, the assistance calculating unit, which are processing circuits, simply need to have any one of the following configurations [a] to [c].

[a] The circuit includes one or more processors that execute various processes in accordance with a computer program. The processor includes a processing device. Examples of the processing device include a CPU, a DSP, and a GPU. The processor includes a memory. Examples of the memory include a RAM, a ROM, and a flash memory. The memory stores program codes or instructions configured to cause the processing device to execute the processes. The memory, or a computer readable medium, includes any type of media that are accessible by general-purpose computers and dedicated computers.

[b] The circuit includes one or more dedicated hardware circuits that execute various processes. Examples of the hardware circuit include an application specific integrated circuit (ASIC), a complex programmable logic device (CPLD), and a field programmable gate array (FPGA).

[c] The circuit includes a processor that executes part of various processes in accordance with a computer program and a hardware circuit that executes the remaining processes.

The functions provided by the drive controller 32, the brake controller 42, and the assistance calculating unit may be partially or entirely provided by the vehicle motion controller 10.

The functions provided by the vehicle motion controller 10 may be provided by another processing circuit that is connected to the vehicle motion controller 10.

The vehicle 90 does not have to include the friction braking device. In a vehicle that does not include the friction braking device, a device that generates a regenerative braking force corresponds to the braking device.

The technical ideas attainable from the above-described embodiments and the modifications are described below.

(Supplemental Claim 1) A vehicle motion control method employed in a vehicle that includes a driver assistance device that assists traveling of the vehicle and an actuator that generates a longitudinal force indicating a force that acts in a longitudinal direction of the vehicle, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the actuator; and obtaining, as availability, a range of the longitudinal force capable of being generated by the actuator, the availability being a controllable range of the longitudinal force, in which the calculating the control amount prohibits the control amount from decreasing when the request longitudinal force is less than a minimum value in the availability.

(Supplemental Claim 2) A vehicle motion control method employed in a vehicle that includes a driver assistance device that assists traveling of the vehicle and an actuator that generates a longitudinal force indicating a force that acts in a longitudinal direction of the vehicle, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the actuator; and obtaining, as availability, a range of the longitudinal force capable of being generated by the actuator, the availability being a controllable range of the longitudinal force, in which the calculating the control amount prohibits the control amount from increasing when the request longitudinal force is greater than a maximum value in the availability.

(Supplemental Claim 3) A vehicle motion control method employed in a vehicle that includes a driver assistance device that assists traveling of the vehicle, an actuator that generates a longitudinal force indicating a force that acts in a longitudinal direction of the vehicle, and an actuator controller that executes traction control that prevents wheelspin of a wheel of the vehicle, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the actuator; and obtaining, as information that indicates availability, information indicating whether the traction control is executed, the availability being a controllable range of the longitudinal force, in which the calculating the control amount prohibits the control amount from increasing when the traction control is executed.

(Supplemental Claim 4) A vehicle motion control method employed in a vehicle that includes a driver assistance device that assists traveling of the vehicle, an actuator that generates a longitudinal force indicating a force that acts in a longitudinal direction of the vehicle, and an actuator controller that executes at least one of anti-lock brake control that prevents a wheel of the vehicle from being locked or anti-skid control that prevents the vehicle from skidding, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the actuator; and obtaining, as information that indicates availability, information indicating whether the at least one of the anti-lock brake control or the anti-skid control is executed, the availability being a controllable range of the longitudinal force, in which the calculating the control amount keeps the control amount constant when the at least one of the anti-lock brake control or the anti-skid control is executed.

(Supplemental Claim 5) A vehicle motion control method employed in a vehicle that includes a driver assistance device that assists traveling of the vehicle, a driving device, and a friction braking device, the driving device and the friction braking device serving as an actuator that generates a longitudinal force indicating a force that acts in a longitudinal direction of the vehicle, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the actuator; and obtaining, as information that indicates availability, a temperature of a frictional member in the friction braking device, the availability being a controllable range of the longitudinal force, in which the calculating the control amount prohibits the control amount from decreasing when the temperature is greater than or equal to a determination temperature.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle motion controller employed in a vehicle that includes a driver assistance device that assists traveling of the vehicle, an actuator that generates a longitudinal force indicating a force that acts in a longitudinal direction of the vehicle, and an actuator controller that executes at least one of anti-lock brake control that prevents a wheel of the vehicle from being locked or anti-skid control that prevents the vehicle from skidding, the vehicle motion controller automatically adjusting a traveling speed of the vehicle based on a request value from the driver assistance device, the vehicle motion controller comprising processing circuitry configured to:

execute feedback control in which a difference between a target acceleration corresponding to the request value and an actual acceleration of the vehicle is an input, thereby calculating a control amount used to reduce the difference;

calculate a request longitudinal force based on the control amount, the request longitudinal force controlling the actuator; and obtain, as information that indicates availability, information indicating whether the at least one of the anti-lock brake control or the anti-skid control is executed, the availability being a controllable range of the longitudinal force, wherein the vehicle motion controller keeps the control amount constant when the at least one of the anti-lock brake control or the anti-skid control is executed.

* * * * *